US008973650B2

(12) United States Patent
Dhingra et al.

(10) Patent No.: US 8,973,650 B2
(45) Date of Patent: Mar. 10, 2015

(54) SUPERCONDUCTIVE HEAT TRANSFER SYSTEM

(75) Inventors: Harish Chandra Dhingra, Friendswood, TX (US); Donald Gordon Laing, Houston, TX (US)

(73) Assignee: General Electric Company, Schenectady, NY (US)

( * ) Notice: Subject to any disclaimer, the term of this patent is extended or adjusted under 35 U.S.C. 154(b) by 1268 days.

(21) Appl. No.: 12/840,251

(22) Filed: Jul. 20, 2010

(65) Prior Publication Data
US 2012/0017564 A1 Jan. 26, 2012

(51) Int. Cl.
*F28F 27/00* (2006.01)
*F02C 7/047* (2006.01)

(52) U.S. Cl.
CPC ............ *F02C 7/047* (2013.01); *F05D 2260/208* (2013.01)
USPC ........ 165/277; 165/276; 415/179; 60/39.093; 60/39.511

(58) Field of Classification Search
USPC ........ 60/39.093, 39.511, 728; 165/52, 66, 86, 165/96, 104.11, 104.15, 104.25, 104.26, 165/276, 277, 909; 415/177, 178, 179; 505/900, 901
See application file for complete search history.

(56) References Cited

U.S. PATENT DOCUMENTS

| | | | | |
|---|---|---|---|---|
| 2,680,345 A * | 6/1954 | Frost | ........................... | 60/39.093 |
| 3,429,122 A * | 2/1969 | Pravda et al. | ................... | 60/487 |
| 3,686,475 A | 8/1972 | Mikkola | | |
| 4,073,136 A * | 2/1978 | Symon | ........................ | 60/39.281 |
| 4,328,666 A * | 5/1982 | Cummins, Jr. | ............. | 60/39.093 |
| 4,831,819 A * | 5/1989 | Norris et al. | ............... | 60/39.093 |
| 4,860,534 A | 8/1989 | Easley et al. | | |
| 5,484,122 A * | 1/1996 | DeSalve | ................... | 244/134 B |
| 6,132,823 A | 10/2000 | Qu | | |
| 6,811,720 B2 | 11/2004 | Qu | | |
| 6,911,231 B2 | 6/2005 | Qu | | |
| 6,916,430 B1 | 7/2005 | Qu | | |
| 7,220,365 B2 * | 5/2007 | Qu et al. | ......................... | 252/70 |
| 7,451,612 B2 * | 11/2008 | Mueller et al. | ................. | 62/260 |
| 7,841,382 B2 * | 11/2010 | Korpan et al. | ................. | 165/41 |
| 7,900,438 B2 * | 3/2011 | Venkataramani et al. | ...... | 60/267 |
| 8,286,696 B2 * | 10/2012 | Grayson et al. | ............... | 165/277 |
| 8,425,223 B2 * | 4/2013 | Zhang et al. | .................... | 431/11 |
| 8,596,073 B2 * | 12/2013 | Zhang | ............................. | 60/772 |
| 2006/0032983 A1 | 2/2006 | Brand et al. | | |
| 2007/0209380 A1* | 9/2007 | Mueller et al. | .................. | 62/260 |
| 2008/0289313 A1* | 11/2008 | Batscha et al. | ................. | 60/39.5 |
| 2012/0031600 A1* | 2/2012 | Dhingra et al. | ............... | 165/173 |
| 2013/0305737 A1* | 11/2013 | Jones et al. | ..................... | 60/779 |

\* cited by examiner

*Primary Examiner* — Matthew W Jellett
(74) *Attorney, Agent, or Firm* — Fletcher Yoder, P.C.

(57) ABSTRACT

A system, including a superconductive heat transfer assembly, including, a first superconductive heat transfer pipe, a second superconductive heat transfer pipe, and a superconductive heat transfer contact switch configured to open and close a gap between the first superconductive heat transfer pipe and the second superconductive heat transfer pipe.

23 Claims, 5 Drawing Sheets

SUPERCONDUCTIVE HEAT TRANSFER SYSTEM

BACKGROUND OF THE INVENTION

The subject matter disclosed herein relates to heat transfer systems for use in various applications, such as a gas turbine engine.

Gas turbines generators are often used to produce electricity for a power grid. The gas turbine generators are typically stationary units disposed in a power plant, such as an integrated gasification combined cycle (IGCC) power plant. However, the gas turbine generators also may be used in mobile units, such as large trailers. These mobile gas turbine generators are useful for locations subject to a natural disaster, a brownout, a blackout, or other power outages. Gas turbines may experience very diverse environmental conditions based on their location. For instance, when these gas turbines are used in cold climates ice can form on the filters as the gas turbine intakes air. Icing whether on the filter or elsewhere in the flow path can obstruct the airflow and degrade turbine performance. Unfortunately, ice has the potential to buildup and if it becomes detached can cause engine failure. Gas turbines damaged from ice can be costly to repair and may require significant downtime.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a superconductive heat transfer assembly, including: a first superconductive heat transfer pipe, a second superconductive heat transfer pipe, and a superconductive heat transfer contact switch configured to open and close a gap between the first superconductive heat transfer pipe and the second superconductive heat transfer pipe.

In a second embodiment, a system including, a superconductive heat transfer assembly, including: a superconductive heat transfer pipe comprising a superconductive heat transfer coating disposed along an interior surface enclosed within the superconductive heat transfer pipe, wherein the superconductive heat transfer pipe comprises a first end portion opposite from a second end portion, and a flow controller configured to control a flow of a first fluid across the first end portion to transfer heat between the first fluid and the superconductive heat transfer pipe.

In a third embodiment, a system including, a superconductive heat transfer assembly, including: a first superconductive heat transfer pipe comprising a first pipe section and a second pipe section, wherein the first pipe section comprises a first superconductive heat transfer coating disposed along a first interior surface enclosed within the first pipe section, and the second pipe section comprising a second superconductive heat transfer coating disposed along a second interior surface enclosed within the second pipe section, a first conductive contact switch configured to open and close a first gap between the first and second pipe sections, a second superconductive heat transfer pipe comprising a third pipe section and a fourth pipe section, wherein the third pipe section comprises a third superconductive heat transfer coating disposed along a third interior surface enclosed within the third pipe section, and the fourth pipe section comprising a fourth superconductive heat transfer coating disposed along a fourth interior surface enclosed within the fourth pipe section, a second conductive contact switch configured to open and close a second gap between the third and fourth pipe sections, and a controller configured to independently control the first and second conductive contact switches.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
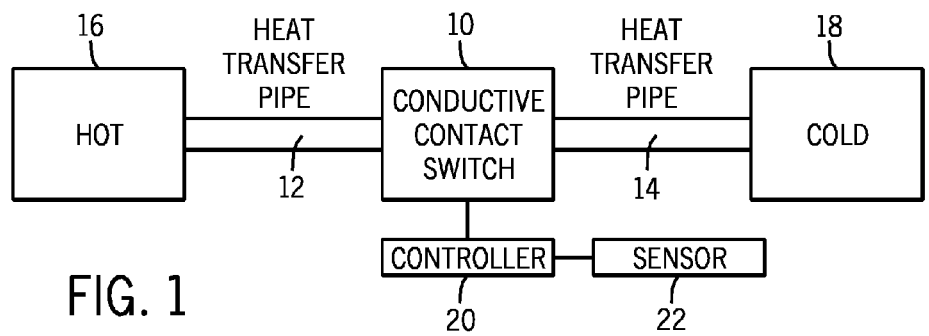
FIG. 1 is a schematic view of an embodiment of superconductive heat transfer pipes and a superconductive heat transfer contact switch.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed toward superconductive heat transfer systems and methods, and particularly a superconductive heat transfer switch configured to enable and disable superconductive heat transfer between structures. As used herein, the disclosed "superconductive heat transfer" structures may be made of any material with an effective thermal conductivity in the range of approximately 10,000 times and higher than of an equivalent copper rod. Although the superconductive heat transfer switch may be used between a variety of structures, the disclosed embodiments present the switch in context of heat transfer pipes (e.g., solid rods or hollow pipes). However, the superconductive heat transfer switch may be used to enable and disable superconductive heat transfer between other structures not limited to pipe-like structures. In certain embodiments, the superconductive heat transfer switch may be used to control superconductive heat transfer from a compressor stage, a combustor, a turbine stage, or an exhaust section of a gas turbine engine to an air intake of the gas turbine engine. In these embodiments, the superconductive heat transfer to the air intake may be used to raise the air intake temperature and/or reduce ice formation. However, the superconductive heat transfer switch may be used in a variety of other systems not limited to a gas turbine engine.

As discussed in detail below, the disclosed embodiments include a variety of superconductive heat transfer switches to control the flow of heat between different structures, e.g., superconductive heat transfer pipes. For example, a space between the superconductive heat transfer pipes may be opened and closed by movement of one of the pipes, an element that selectively bridges the space, or a combination thereof. By further example, a superconductive heat transfer pipe may be selectively exposed and unexposed to a heat source, such as a gas turbine exhaust. The selective exposure may be accomplished by moving the superconductive heat transfer pipe in and out of the heat source (e.g., gas turbine exhaust), or by opening and closing a flow of the heat source to the superconductive heat transfer pipe. For example, the superconductive heat transfer pipe may extend into an enclosure, which selectively receives the gas turbine exhaust by opening and closing a by-pass door along the exhaust flow path of the gas turbine engine. In some embodiments, a plurality of superconductive heat transfer switches may be used to provide discrete steps of superconductive heat transfer between structures. For example, the plurality of superconductive heat transfer switches may be mounted between a pair of superconductive heat transfer manifolds. The following discussion provides details of various embodiments of the aforementioned superconductive heat transfer switches, but is not intended to be limiting to any structure or application.

FIG. 1 is a schematic view of a superconductive heat transfer contact switch 10 that selectively connects and disconnects two superconductive heat transfer pipes 12 and 14 between a hot region or high energy source 16 and a cold region or low energy target 18. In certain embodiments, the contact switch 10 may selectively bridge a space between the pipes 12 and 14 by moving one or both of the pipes 12 and 14, moving an element across the space between the pipes 12 and 14, or a combination thereof. The high energy source 16 may include waste heat from a plant component, such as an integrated gasification combined cycle (IGCC) plant component, a gasification component, a gas treatment component, a compressor, or an engine such as a gas turbine engine. The low energy target 18 is any component, fluid, or target that may benefit from additional heat acquired from the high energy source 16. Thus, similar to the high energy source 16, the low energy target 18 may include one or more plant components. In certain embodiments, the high energy source 16 may include heat from one or more compression stages, combustors, turbine stages, or an exhaust section of a gas turbine engine, while the low energy target 18 may include an air intake section. Accordingly, the contact switch 10 may be used to selectively transfer heat generated in the gas turbine engine to the air intake section, thereby heating the intake air and/or reducing ice formation.

As illustrated in FIG. 1, the controller 20 controls the superconductive heat transfer contact switch 10. When the controller 20 closes the contact switch 10, energy is able to flow from the high energy source 16 to the low energy target 18 through the pipes 12 and 14. When the controller 20 opens the contact switch 10, energy is not able to flow from the high energy source 16 to the low energy target 18 through the pipes 12 and 14. As discussed above, the contact switch 10 and pipes 12 and 14 may have an effective thermal conductivity of approximately 10,000 times or higher than that of an equivalent copper rod. In some embodiments, the controller 10 may receive input from a human operator. For instance, if the operator observes ice forming in the low energy target 18 (e.g., an air intake section of a gas turbine engine), then the operator may close the contact switch 10 via the controller 20. Likewise, if the operator does not observe any ice formation in the low energy target 18, then the operator may open the contact switch 10 via the controller 20. In still further embodiments, one or more sensors 22 transmit feedback signals to the controller 20 to enable automatic control of the contact switch 10. The controller 20 interprets the signals from the sensor 20 and determines whether to open or close the contact switch 10 without operator input. The sensor 22 may include a temperature sensor, a humidity sensor, a strain gage, an air flow sensor, an optical sensor, a weight sensor, a vibration sensor, an emissions sensor, or any other suitable sensor. These sensors 22 could either communicate the actual presence of ice, possible formation of ice, or the likelihood that ice will start to form in the low energy target 18, thereby triggering the controller 20 to actuate the contact switch 10. However, the sensors 22 may be used to indicate any other parameter not limited to ice formation, and then trigger the controller 20 to open or close the contact switch 10.

Figure 2:
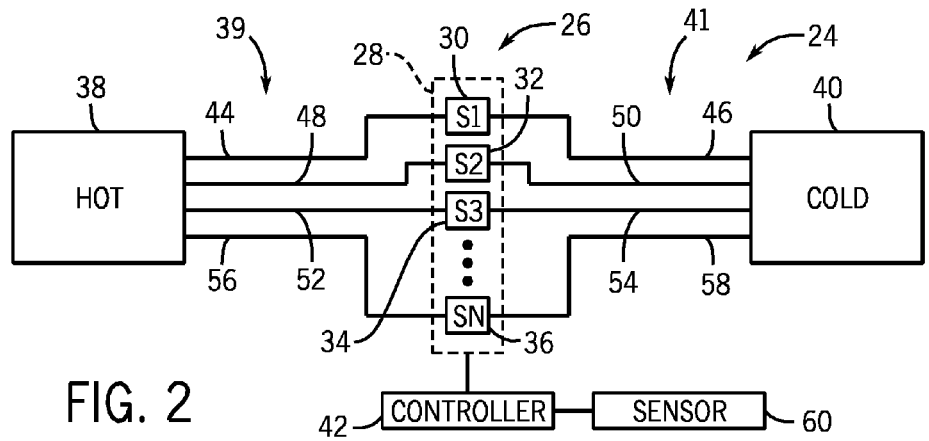
FIG. 2 is a schematic view of an embodiment with multiple superconductive heat transfer pipes and corresponding superconductive heat transfer contact switches.

FIG. 2 is a schematic view of a superconductive heat transfer system 24 having a switch system 26 configured to enable and disable superconductive heat transfer. In the illustrated embodiment, the switch system 26 includes a plurality of superconductive heat transfer contact switches 28, including contact switches 30, 32, 34, and 36. However, other embodiments may have any number of contact switches 28, e.g., 1 to 100. The contact switches 28 selectively connect and disconnect first and second sets of superconductive heat transfer pipes 39 and 41 between a hot region or high energy source 38 and a cold region or low energy target 40. For example, the contact switch 30 selectively connects and disconnects first and second superconductive heat transfer pipes 44 and 46, the contact switch 32 selectively connects and disconnects first and second superconductive heat transfer pipes 48 and 50, the contact switch 34 selectively connects and disconnects first and second superconductive heat transfer pipes 52 and 54, and the contact switch 36 selectively connects and disconnects first and second superconductive heat transfer pipes 56 and 58. Each superconductive heat transfer path through the first pipes 39, the contact switches 28, and the second pipes 41 may have an equal or different heat conducting capacity. For example, the contact switches 28 and pipes 39 and 41 may be made with different materials and/or cross-sectional areas, which increase or decrease the heat conducting capacity. Furthermore, each contact switch 28 may be used alone or in combination with other contact switches 28 to provide discrete changes in the superconductive heat transfer between the hot and cold regions 38 and 40.

The controller 42 controls each superconductive heat transfer contact switch 28 in response to manual input, sensor feedback from one or more sensors 60, instructions stored in memory, or a combination thereof. When the controller 42 closes the contact switches 28, energy is able to flow from the high energy source 38 to the low energy target 40 through the pipes 39 and 41. When the controller 42 opens the contact switches 28, energy is not able to flow from the high energy source 38 to the low energy target 40 through the pipes 39 and 41. As discussed above, the contact switches 28 and pipes 39 and 41 may have an effective thermal conductivity of approximately 10,000 or higher than that of an equivalent copper rod. The controller 20 may selectively open and close each contact switch 28 alone or in combination with the other switches, thereby providing discrete steps in the heat transfer capacity of the system 24. In the illustrated embodiment, the one controller 42 is configured to control all of the switches 28. In other embodiments, an independent controller 42 may be used for each contact switch 28.

One or more sensors 60 provide feedback to the controller 42 to facilitate control of the contact switches 28. In embodiments with an independent controller 42 for each contact switch 28, one or more sensors 60 may be dedicated to each controller 42 to facilitate independent control of each contact switch 28, or the sensors 60 may be shared among the controllers 42. The sensors 60 may include a temperature sensor, a humidity sensor, a strain gage, an air flow sensor, an optical sensor, a weight sensor, a vibration sensor, an emissions sensor, or any other suitable sensor. In certain embodiments, the sensors 60 and pipes 41 may be distributed to different locations in the low energy target 40, e.g., different cold spots in a system. For example, if the sensor 60 in a first cold spot indicates a need for heat, then the controller 42 may open the contact switch 30 to enable superconductive heat transfer through the pipes 44 and 46 to the first cold spot. Likewise, if the sensor 60 in a second cold spot indicates a need for heat, then the controller 42 may open the contact switch 32 to enable superconductive heat transfer through the pipes 48 and 50 to the second cold spot. Similar to the distribution in the low energy target 40, the pipes 39 and sensors 60 may be distributed to different locations in the high energy source 38, wherein each location may correspond to a different temperature or supply of heat. The controller 42 may selectively open and close the contact switches 28 based on these different hot spots and cold spots, environmental conditions, and other factors. These sensors 60 could either communicate the actual presence of ice, possible formation of ice, or the likelihood that ice will start to form in the low energy target 40, thereby triggering the controller 42 to actuate the contact switches 28. However, the sensors 60 may be used to indicate any other parameter not limited to ice formation, and then trigger the controller 42 to open or close the contact switches 28.

Figure 3:
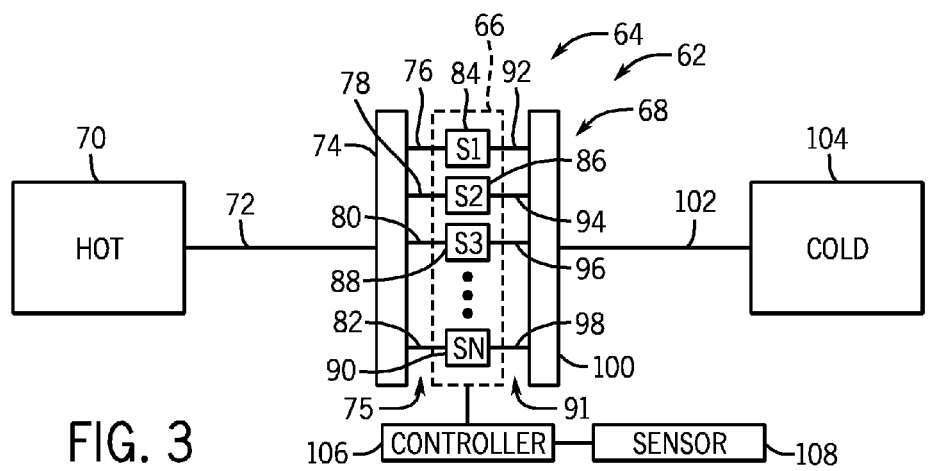
FIG. 3 is a schematic view of an embodiment with superconductive heat transfer manifolds connected by superconductive heat transfer pipes and associated superconductive heat transfer contact switches.

FIG. 3 is a schematic view of a superconductive heat transfer system 62 having a switch system 64 configured to enable and disable superconductive heat transfer. In the illustrated embodiment, the switch system 64 includes a plurality of superconductive heat transfer contact switches 66 disposed in a manifold system 68 between a hot region or high energy source 70 and a cold region or low energy target 104. As discussed below, the manifold system 68 is configured to enable use of multiple contact switches 66 with less piping between the source 70 and the target 104.

The high energy source 70 is coupled to a superconductive heat transfer pipe 72 leading to a superconductive heat transfer manifold 74 of the manifold system 68. The manifold 74 couples to the switch system 64 through a plurality of superconductive heat transfer pipes 75, including pipes 76, 78, 80, and 82. For example, the pipe 76 couples to a superconductive heat transfer contact switch 84, the pipe 78 couples to a superconductive heat transfer contact switch 86, the pipe 80 couples to a superconductive heat transfer contact switch 88, and the pipe 82 couples to a superconductive heat transfer contact switch 90. In turn, the switch system 64 couples to a superconductive heat transfer manifold 100 of the manifold system 68 through a plurality of superconductive heat transfer pipes 91, including pipes 92, 94, 96, and 98. For example, the pipe 92 couples to the superconductive heat transfer contact switch 84, the pipe 94 couples to the superconductive heat transfer contact switch 86, the pipe 96 couples to the superconductive heat transfer contact switch 88, and the pipe 98 couples to the superconductive heat transfer contact switch 90. In the illustrated embodiment, a set of four superconductive heat transfer paths extend through the contact switches 66 and corresponding pipes 75 and 91. However, other embodiments may include any number of superconductive heat transfer paths (e.g., 1 to 100) defined by the contact switches 66 and corresponding pipes 75 and 91. Finally, the manifold 100 couples to the low energy target 104 through a superconductive heat transfer pipe 102. In the illustrated embodiment, a single pipe 72 is coupled to the manifold 74 and a single pipe 102 is coupled to the manifold 100. In other embodiments, any number of pipes may be coupled to the manifolds 74 and 100.

The system 62 of FIG. 3 includes a controller 106 configured to control each superconductive heat transfer contact switch 66 in response to manual input, sensor feedback from one or more sensors 108, instructions stored in memory, or a combination thereof. When the controller 106 closes the contact switches 66, energy is able to flow from the high energy source 70 to the low energy target 104 through the pipes 72 and 102 and the pipes 75 and 91. When the controller 106 opens the contact switches 66, energy is not able to flow from the high energy source 70 to the low energy target 104 through the pipes 72 and 102 and the pipes 75 and 91. As discussed above, the contact switches 66 and pipes 72 and 102 and the pipes 75 and 91 may have an effective thermal conductivity of approximately 10,000 times or higher than that of an equivalent copper rod. The controller 106 may selectively open and close each contact switch 66 alone or in combination with the other switches, thereby providing discrete steps in the heat transfer capacity of the system 62. In the illustrated embodiment, the one controller 106 is configured to control all of the switches 66. In other embodiments, an independent controller 106 may be used for each contact switch 66.

One or more sensors 108 provide feedback to the controller 106 to facilitate control of the contact switches 66. In embodiments with an independent controller 106 for each contact switch 66, one or more sensors 108 may be dedicated to each controller 106 to facilitate independent control of each contact switch 66, or the sensors 108 may be shared among the controllers 106. The sensors 108 may include a temperature sensor, a humidity sensor, a strain gage, an air flow sensor, an optical sensor, a weight sensor, a vibration sensor, an emissions sensor, or any other suitable sensor. The controller 106 may selectively open and close the contact switches 66 based on the feedback signals from the sensors 108. For example, these sensors 108 could either communicate the actual presence of ice, possible formation of ice, or the likelihood that ice will start to form in the low energy target 104, thereby triggering the controller 106 to actuate the contact switches 66. However, the sensors 108 may be used to indicate any other parameter not limited to ice formation, and then trigger the controller 106 to open or close the contact switches 66.

Figure 4:
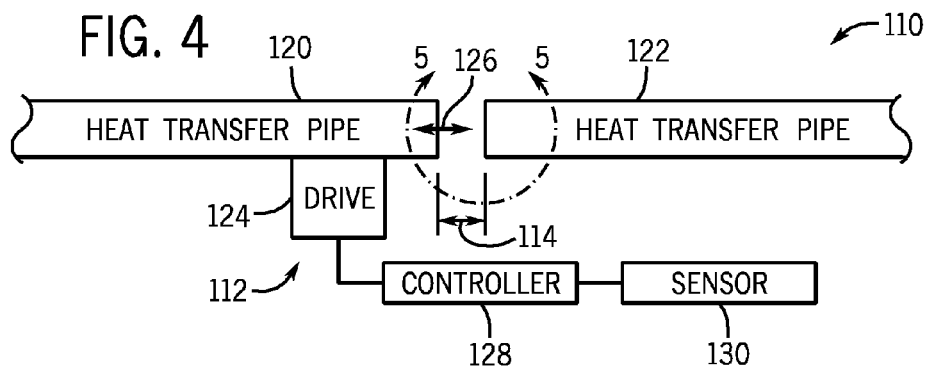
FIG. 4 is a schematic view of an embodiment of superconductive heat transfer pipes with a drive that moves one of the superconductive heat transfer pipes into contact with the other superconductive heat transfer pipe.

FIG. 4 is a schematic view of an embodiment of a superconductive heat transfer system 110 having a switch system 112 configured to enable and disable superconductive heat transfer (e.g., open and close a space 114) between superconductive heat transfer pipes 120 and 122. In the illustrated embodiment, the switch system 112 includes a drive 124 coupled to the superconductive heat transfer pipe 120, such that the drive 124 can selectively move the pipe 120 in directions 126 toward and away from the pipe 122 to open and close the intermediate space 114. In certain embodiments, the drive 124 may be configured to move both pipes 120 and 122 toward and away from one another, or a second drive may be coupled to the pipe 122 and cooperate with the drive 124. In either embodiment, one or both of the pipes 120 and 122 moves to enable and disable the superconductive heat transfer through the pipes 120 and 122.

As discussed above, the controller 128 receives signals from the sensor 130. The controller 128 interprets these signals to determine whether the contact switch 112 should be closed or opened. If the controller 128 determines that the contact switch 112 needs to be opened based on the signals, then the controller 128 signals the drive 124 to move the superconductive heat transfer pipe 120 away from the superconductive heat transfer pipe 122. If the controller 128 determines that the contact switch 112 needs to be closed based on the signals, then the controller 128 signals the drive 124 to move the pipe 120 toward pipe 122 until their ends contact each other. The contact between the pipes 120 and 122 creates a superconductive heat transfer path through the pipes 120 and 122.

Figure 5:
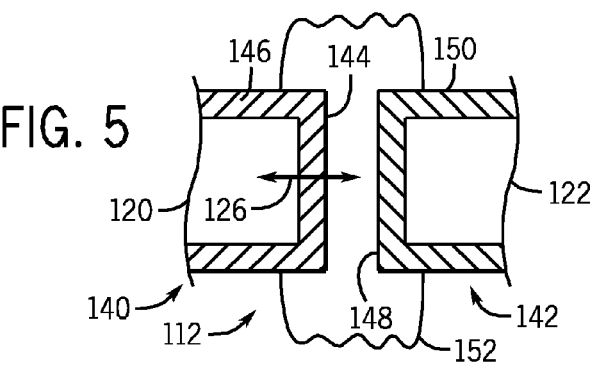
FIG. 5 is a schematic view of an embodiment of superconductive heat transfer pipe ends and their contact surfaces taken within line 5-5 of FIG. 4.

FIG. 5 is a partial schematic view of an embodiment of the pipes 120 and 122 taken within line 5-5 of FIG. 4, illustrating superconductive heat transfer pipe ends 140 and 142. As discussed above, the drive 124 selectively moves the pipe ends 140 and 142 toward and away from one another to open and close the space 114, thereby controlling the superconductive heat transfer between the pipes 120 and 122. In the illustrated embodiment, the pipe end 140 includes a flat end face 144 and a cylindrical wall 146, and the pipe end 142 includes a flat end face 148 and a cylindrical wall 150. The illustrated flat end faces 144 and 148 are generally perpendicular to an axis of the pipes 120 and 122. Thus, as the contact switch 112 uses the drive 124 to move the pipes 120 and/or 122 toward one another in the direction 126, the flat end faces 144 and 148 eventually contact one another and conduct heat along a flat interface perpendicular to the axis of the pipes 120 and 122. In certain embodiments, the flat end faces 144 and 148 may include one or more layers to increase heat transfer across the flat interface. Furthermore, a protective sleeve 152 may be disposed about the pipe ends 140 and 142 to block contaminants from entering the space 114 between the flat end faces 144 and 148. The protective sleeve 152 may be made from a thermal insulating material and/or the sleeve 152 may be offset from the cylindrical walls 146, such that a conductive heat transfer path does not exist while the flat end faces 144 and 148 are offset from one another.

Figure 6:
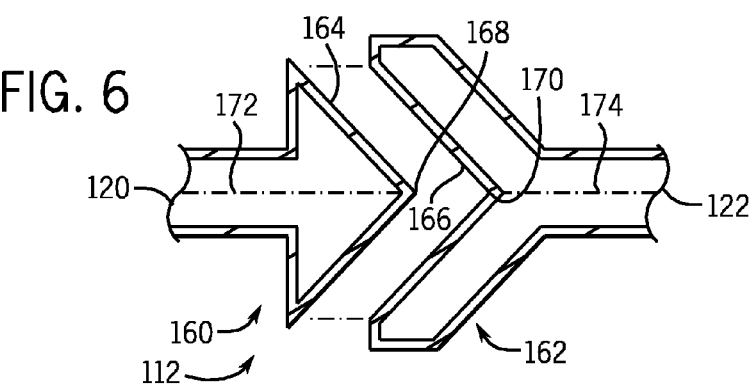
FIG. 6 is a schematic view of an embodiment of superconductive heat transfer pipe ends and their contact surfaces taken within line 5-5 of FIG. 4.

FIG. 6 is a partial schematic view of an embodiment of the pipes 120 and 122 taken within line 5-5 of FIG. 4, illustrating superconductive heat transfer pipe ends 160 and 162. As discussed above, the drive 124 selectively moves the pipe ends 160 and 162 toward and away from one another to open and close the space 114, thereby controlling the superconductive heat transfer between the pipes 120 and 122. In the illustrated embodiment, the pipe end 160 includes a male conical end surface 164, and the pipe end 162 includes a female conical end surface 166. The male and female conical end surfaces 164 and 166 serve several functions. For example, the male and female conical end surfaces 164 and 166 facilitate alignment. As the pipe ends 160 and 162 approach one another, the conical end surfaces 164 and 166 gradually move a conical tip 168 of the surface 164 toward a conical recess 170 of the surface 166, thereby aligning an axis 172 of the pipe 120 with an axis 174 of the pipe 122. The male and female conical end surfaces 164 and 166 also function to provide a wedge fit or compression fit between the pipe ends 160 and 162, thereby ensuring a tight interface and efficient conductive heat transfer between the pipes 120 and 122. Furthermore, the male and female conical end surfaces 164 and 166 increase the contact surface area between the pipe ends 160 and 162, which also increases the conductive heat transfer between the pipes 120 and 122. Similar to the embodiment of FIG. 5, the conical end surfaces 164 and 166 may include one or more layers to increase heat transfer across the conical interface.

Figure 7:
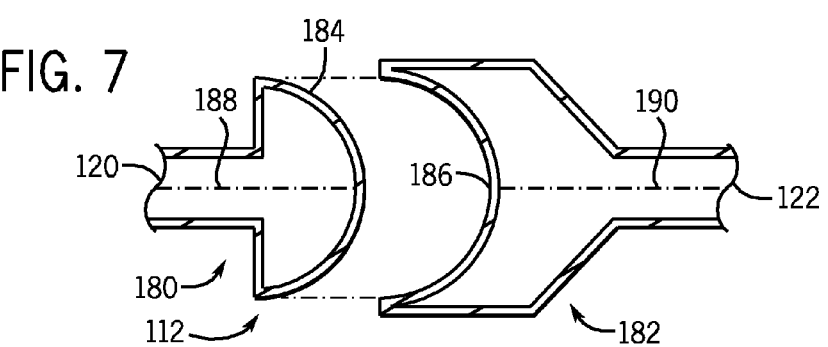
FIG. 7 is a schematic view of an embodiment of superconductive heat transfer pipe ends and their contact surfaces taken within line 5-5 of FIG. 4.

FIG. 7 is a partial schematic view of an embodiment of the pipes 120 and 122 taken within line 5-5 of FIG. 4, illustrating superconductive heat transfer pipe ends 180 and 182. As discussed above, the drive 124 selectively moves the pipe ends 180 and 182 toward and away from one another to open and close the space 114, thereby controlling the superconductive heat transfer between the pipes 120 and 122. In the illustrated embodiment, the pipe end 180 includes a male curved end surface 184 (e.g., convex surface), and the pipe end 182 includes a female curved end surface 186 (e.g., concave surface). The male and female curved end surfaces 184 and 186 serve several functions. For example, the male and female curved end surfaces 184 and 186 facilitate alignment. As the pipe ends 180 and 182 approach one another, the curved end surfaces 184 and 186 gradually align an axis 188 of the pipe 120 with an axis 190 of the pipe 122. The male and female curved end surfaces 184 and 186 also function to provide a wedge fit or compression fit between the pipe ends 180 and 182, thereby ensuring a tight interface and efficient conductive heat transfer between the pipes 120 and 122. Furthermore, the male and female curved end surfaces 184 and 186 increase the contact surface area between the pipe ends 180 and 182, which also increases the conductive heat transfer between the pipes 120 and 122. Similar to the embodiment of FIG. 5, the curved end surfaces 184 and 186 may include one or more layers to increase heat transfer across the conical interface.

Figure 8:
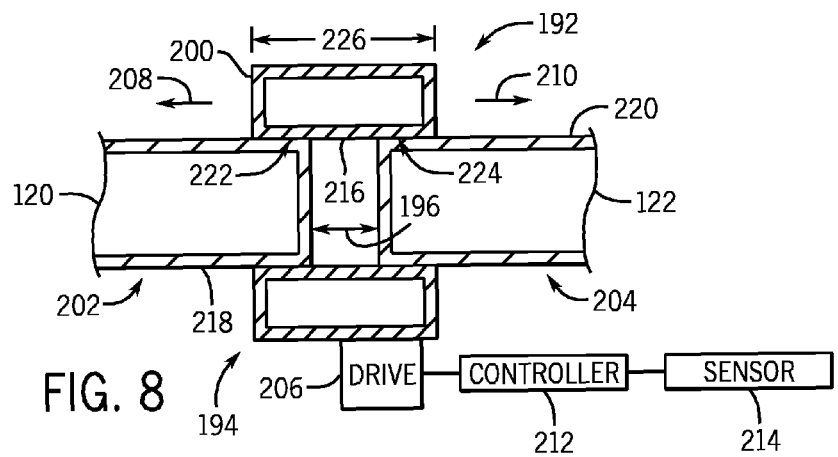
FIG. 8 is a schematic view of an embodiment of superconductive heat transfer pipes with a superconductive heat transfer connector driven by a drive.

FIG. 8 is a partial schematic view of an embodiment of a superconductive heat transfer system 192 having a switch system 194 configured to enable and disable superconductive heat transfer (e.g., open and close a space 196) between superconductive heat transfer pipes 120 and 122. The switch system 194 includes a superconductive heat transfer connector 200 selectively coupling superconductive heat transfer pipe ends 202 and 204 via a drive 206. In the illustrated embodiment, the drive 206 is coupled to the connector 200 rather than the pipes 120 and 122, and the drive 206 is configured to move the connector 200 lengthwise along the pipe ends 202 and 204 in axial directions 208 or 210. For example, the drive 206 may move the connector 200 to the illustrating position bridging the gap 196 between the pipe ends 202 and 204, or the drive 206 may move the connector 200 to a position away from one of the pipe ends 202 or 204 to open the gap 196 (i.e., sever the bridge) between the pipe ends 202 and 204. As discussed below, the drive 206 is responsive to a controller 212 that receives feedback from one or more sensors 214, thereby enabling automatic control of the switch system 194.

The illustrated connector 200 has an interior surface 216 that selectively contacts an outer surface 218 of the pipe end 202 and an outer surface 220 of the pipe end 204. For example, the connector 200 may be a hollow cylinder having the inner surface 216 (e.g., annular surface) disposed about the respective pipe ends 202 and 204 (e.g., annular surfaces 218 and 220). Thus, the surfaces 216 and 218 define a first annular contact interface 222 and the surfaces 216 and 220 define a second annular contact interface 224. These contact interfaces 222 and 224 have a radial compressive force between the connector 200 and the pipe ends 202 and 204, rather than an axial compressive force between end faces of the pipe ends 202 and 204. The contact interfaces 222 and 224 have a surface area that may be increased or decreased by adjusting a length 226 of the connector 200. For example, a greater length 226 may be provided to increase the surface area, thereby increasing the amount of superconductive heat transfer across the connector 200. In addition, the annular surfaces 216, 218, and/or 220 may be coated with a high conductivity material to increase superconductive heat transfer between the connector 200 and the pipes 120 and 122.

As discussed above, the controller 212 receives signals from one or more sensors 214. For example, the sensors 216 may include a temperature sensor, a humidity sensor, a strain gage, an air flow sensor, an optical sensor, a weight sensor, a vibration sensor, an emissions sensor, or any other suitable sensor. The controller 212 interprets these signals to determine whether the contact switch 194 should be closed or opened. If the controller 212 determines that the contact switch 194 needs to be opened based on the signals, then the controller 212 signals the drive 206 to move the connector 200 away from one of the pipe ends 202 or 204 to open the gap 196. If the controller 212 determines that the contact switch 194 needs to be closed based on the signals, then the controller 212 signals the drive 206 to move the connector 200 to the illustrated position bridging the gap 196 by making contact with both pipe ends 202 and 204. The contact between the connector 200 and the pipes 120 and 122 creates a superconductive heat transfer path through the pipes 120 and 122 and the connector 200.

Figure 9:
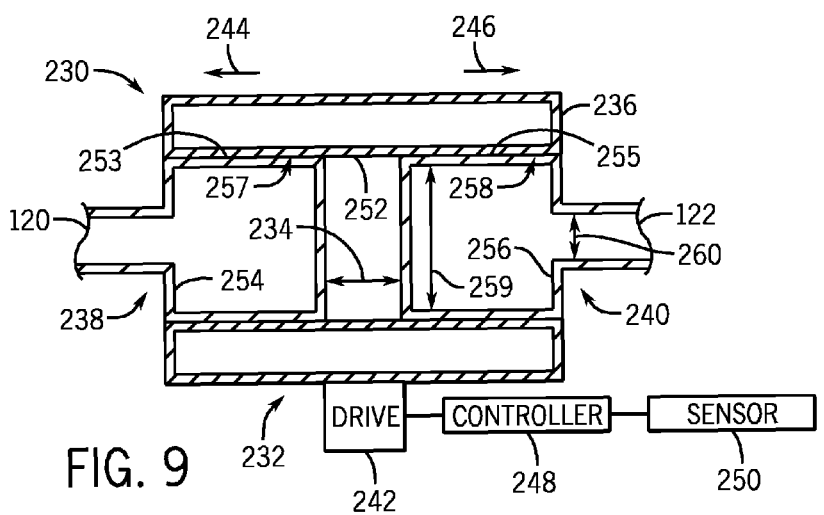
FIG. 9 is a schematic view of an embodiment of superconductive heat transfer pipes with a superconductive heat transfer connector driven by a drive.

FIG. 9 is a partial schematic view of an embodiment of a superconductive heat transfer system 230 having a switch system 232 configured to enable and disable superconductive heat transfer (e.g., open and close a space 234) between superconductive heat transfer pipes 120 and 122. The switch system 232 includes a superconductive heat transfer connector 236 selectively coupling superconductive heat transfer pipe ends 238 and 240 via a drive 242. In the illustrated embodiment, the drive 242 is coupled to the connector 236 rather than the pipes 120 and 122, and the drive 242 is configured to move the connector 236 lengthwise along the pipe ends 238 and 240 in axial directions 244 or 246. For example, the drive 242 may move the connector 236 to the illustrating position bridging the gap 234 between the pipe ends 238 and 240, or the drive 242 may move the connector 236 to a position away from one of the pipe ends 238 or 240 to open the gap 234 (i.e., sever the bridge) between the pipe ends 238 and 240. As discussed below, the drive 242 is responsive to a controller 248 that receives feedback from one or more sensors 250, thereby enabling automatic control of the switch system 232.

The illustrated connector 236 has an interior surface 252 that selectively contacts an outer surface 253 of the pipe end 238 (e.g., an enlarged end portion 254) and an outer surface 255 of the pipe end 240 (e.g., an enlarged end portion 256). For example, the connector 236 may be a hollow cylinder having the inner surface 252 (e.g., annular surface) disposed about the respective enlarged end portions 256 (e.g., annular surfaces 253 and 255). Thus, the surfaces 252 and 253 define a first annular contact interface 257 and the surfaces 252 and 255 define a second annular contact interface 258. These contact interfaces 257 and 258 have a radial compressive force between the connector 236 and the enlarged end portions 254 and 256, rather than an axial compressive force between end faces of the pipe ends 238 and 240. In contrast to the embodiment of FIG. 8, the contact interfaces 257 and 258 have an increased surface area due to the larger diameter 259 of the enlarged end portions 254 and 256 relative to the diameter 260 of the pipes 120 and 122. For example, the diameter 259 may be approximately 1.1 to 20 times the diameter 260, thereby substantially increasing the surface area of the interfaces 257 and 258. Similar to the embodiment of FIG. 8, the length of the connector 236 also may be adjusted to change the surface area of the interfaces 257 and 258. As a result, the increased surface area may substantially increase the amount of superconductive heat transfer across the connector 236. In addition, the annular surfaces 252, 253, and/or 255 may be coated with a high conductivity material to increase superconductive heat transfer between the connector 236 and the pipes 120 and 122.

As discussed above, the controller 248 receives signals from one or more sensors 250. The controller 248 interprets these signals to determine whether the contact switch 232 should be closed or opened. If the controller 248 determines that the contact switch 232 needs to be opened based on the signals, then the controller 248 signals the drive 242 to move the connector 236 away from one of the enlarged end portions 254 or 256 to open the gap 234. If the controller 248 determines that the contact switch 232 needs to be closed based on the signals, then the controller 248 signals the drive 242 to move the connector 236 to the illustrated position bridging the gap 234 by making contact with both enlarged end portions 254 and 256. The contact between the connector 236 and the enlarged end portions 254 and 256 creates a superconductive heat transfer path through the pipes 120 and 122 and the connector 236.

Figure 10:
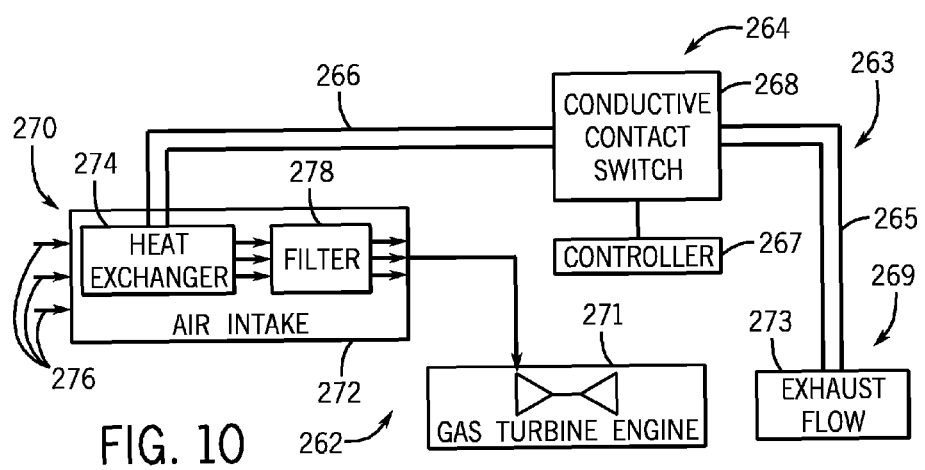
FIG. 10 is a schematic view of an embodiment of an anti-icing system for a gas turbine using superconductive heat transfer pipes to transfer energy from the gas turbine exhaust flow to the gas turbine air intake.

FIG. 10 is a schematic view of an embodiment of an anti-icing system 262 having a superconductive heat transfer system 263 with a switch system 264 configured to enable and disable superconductive heat transfer for purposes of reducing or inhibiting ice formation. In the illustrated embodiment, the superconductive heat transfer system 263 includes the switch system 264 disposed between superconductive heat transfer pipes 265 and 266, wherein the switch system 264 includes a controller 267 coupled to a conductive contact switch 268 such as illustrated in FIGS. 1-9. For example, the contact switch 268 may include a drive coupled to one of the pipes 265 or 266 to selectively move the pipes 265 and 266 toward or away from one another, a drive coupled to a connector that selectively opens and closes a gap between the pipes 265 and 266, or a combination thereof. The anti-icing system 262 uses the superconductive heat transfer system 263 to selectively transfer heat from a heat source 269 to a cold region 270 by controlling the position of the contact switch 268. If the controller 267 identifies a need for reducing or inhibiting ice formation, then the controller 267 may command the contact switch 268 to bridge a gap between the pipes 265 and 266 to enable superconductive heat transfer from the heat source 269 to the cold region 270. Otherwise, the controller 267 may command the contact switch 268 to open the gap between the pipes 265 and 266 to disable superconductive heat transfer.

In the illustrated embodiment, the anti-icing system 262 is coupled to a gas turbine engine 271. However, the system 262 may be used for anti-icing of any suitable application, such as machinery, engines, compressors, vehicles, or plant equipment. The gas turbine engine 271 includes one or more compression stages, one or more combustors, and one or more turbine stages. For example, the gas turbine engine 271 operates to receive air through an air intake 272, compress the air via compressor blades in the compression stages, combust a mixture of the air and fuel in the combustors, drive turbine blades in the turbine stages with the hot combustion gases, and output an exhaust flow 273. The exhaust flow 273 carries a considerable amount of heat, and is used as the heat source 269 in the illustrated embodiment. However, other embodiments may use other sources of heat, such as a gasifier, a gas treatment unit, or another plant component. In contrast, the air intake 272 represents the cold region 270, which may vary in temperature depending on the climate, season, and weather conditions. As illustrated, the anti-icing system 262 uses the superconductive heat transfer system 263 to selectively transfer heat from the exhaust flow 273 to the air intake 272 by controlling the position of the contact switch 268.

In the air intake 272, the anti-icing system 262 includes a heat exchanger 274 configured to transfer heat from the pipe 266 to an incoming air flow 276, and a filter 278 to remove particulate matter and/or moisture from the incoming air flow 276. In certain embodiments, the heat exchanger 274 may include a plurality of fins coupled to or integral with the pipe 266. For example, the pipe 266 may terminate with fins protruding into the air flow 276 upstream of the filter 278. However, the heat exchanger 274 also may include a direct connection with the filter 278, a filter housing, or other structure in the air flow path into the gas turbine engine 271. In certain embodiments, the anti-icing system 262 also may couple the superconductive heat transfer system 263 to other components susceptible to ice formation or reduced performance at low temperatures, e.g., a water injection system and/or a fuel injection system for the gas turbine engine 271.

Figure 11:
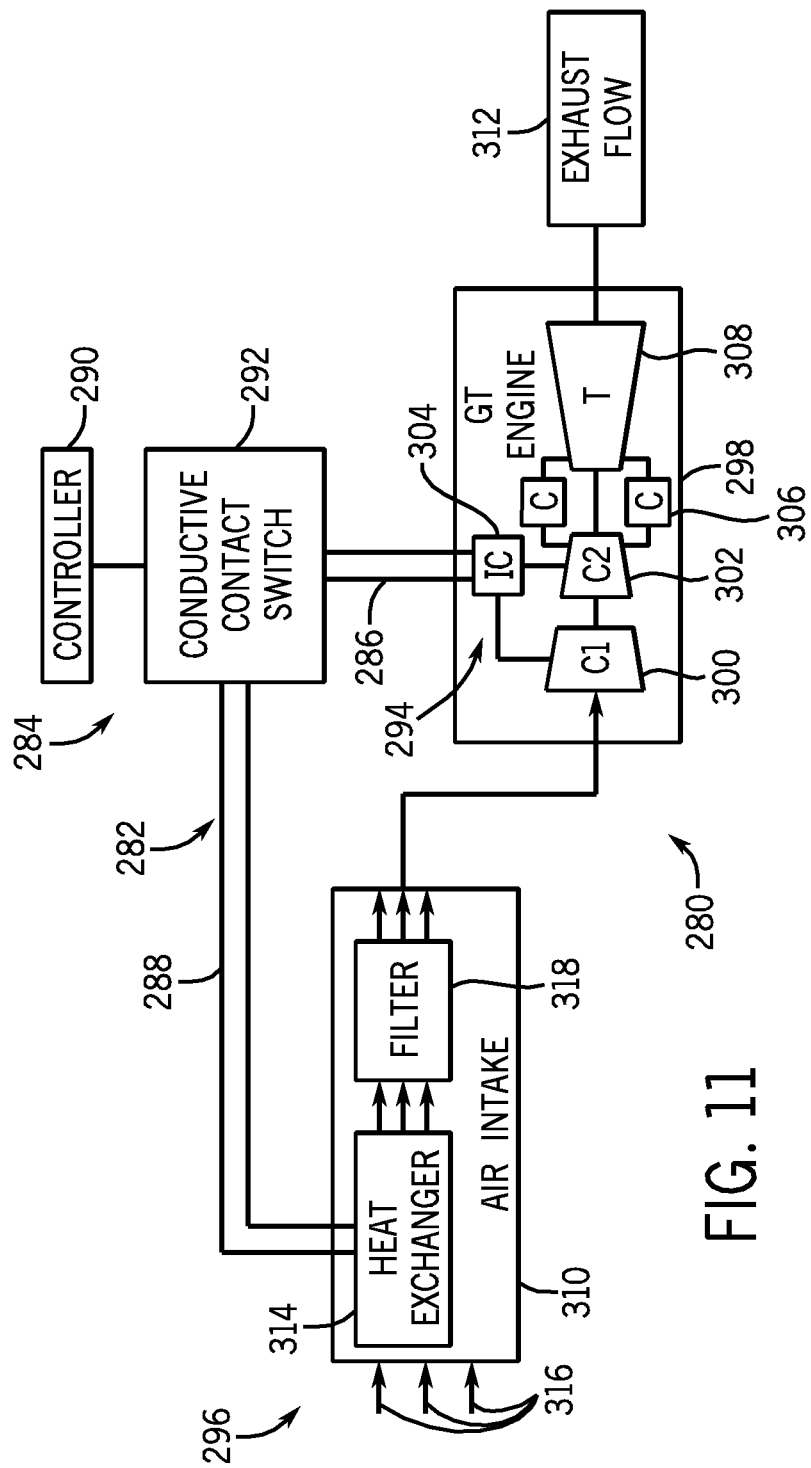
FIG. 11 is a schematic view of an embodiment of an anti-icing system for a gas turbine using superconductive heat transfer pipes to transfer energy from the intercooler cooler to the gas turbine air intake.

FIG. 11 is a schematic view of an embodiment of an anti-icing system 280 having a superconductive heat transfer system 282 with a switch system 284 configured to enable and disable superconductive heat transfer for purposes of reducing or inhibiting ice formation. In the illustrated embodiment, the superconductive heat transfer system 282 includes the switch system 284 disposed between superconductive heat transfer pipes 286 and 288, wherein the switch system 284 includes a controller 290 coupled to a conductive contact switch 292 such as illustrated in FIGS. 1-9. For example, the contact switch 292 may include a drive coupled to one of the pipes 286 or 288 to selectively move the pipes 286 and 288 toward or away from one another, a drive coupled to a connector that selectively opens and closes a gap between the pipes 286 and 288, or a combination thereof. The anti-icing system 280 uses the superconductive heat transfer system 282 to selectively transfer heat from a heat source 294 to a cold region 296 by controlling the position of the contact switch 292. If the controller 290 identifies a need for reducing or inhibiting ice formation, then the controller 290 may command the contact switch 292 to bridge a gap between the pipes 286 and 288 to enable superconductive heat transfer from the heat source 294 to the cold region 296. Otherwise, the controller 290 may command the contact switch 292 to open the gap between the pipes 286 and 288 to disable superconductive heat transfer.

In the illustrated embodiment, the anti-icing system 280 is coupled to a gas turbine engine 298. However, the system 280 may be used for anti-icing of any suitable application, such as machinery, engines, compressors, vehicles, or plant equipment. The gas turbine engine 298 includes one or more compression stages, one or more combustors, and one or more turbine stages. For example, the illustrated gas turbine engine 298 includes an upstream compression stage 300, a downstream compression stage 302, a compressor intercooler 304, at least one combustor 306, and at least one turbine stage 308. The gas turbine engine 298 operates to receive air through an air intake 310, compress the air via compressor blades in the compression stages 300 and 302, cool the air in the compressor intercooler 304 between the compression stages 300 and 302, combust a mixture of the air and fuel in the combustors 306, drive turbine blades in the turbine stages 308 with the hot combustion gases, and output an exhaust flow 312. In the illustrated embodiment, the intercooler 304 is used as the heat source 294, rather than using the exhaust flow 312 as the heat source as illustrated in FIG. 10. In other embodiments, the heat source 294 may include other internal components of the gas turbine engine 298, such as the combustors 306 or the turbine stages 308. Similar to the embodiment of FIG. 10, the air intake 310 represents the cold region 296, which may vary in temperature depending on the climate, season, and weather conditions. As illustrated, the anti-icing system 280 uses the superconductive heat transfer system 282 to selectively transfer heat from the intercooler 304 to the air intake 310 by controlling the position of the contact switch 292.

In the air intake 310, the anti-icing system 280 includes a heat exchanger 314 configured to transfer heat from the pipe 288 to an incoming air flow 316, and a filter 318 to remove particulate matter and/or moisture from the incoming air flow 316. In certain embodiments, the heat exchanger 314 may include a plurality of fins coupled to or integral with the pipe 288. For example, the pipe 288 may terminate with fins protruding into the air flow 316 upstream of the filter 318. However, the heat exchanger 314 also may include a direct connection with the filter 318, a filter housing, or other structure in the air flow path into the gas turbine engine 298. In certain embodiments, the anti-icing system 280 also may couple the superconductive heat transfer system 282 to other components susceptible to ice formation or reduced performance at low temperatures, e.g., a water injection system and/or a fuel injection system for the gas turbine engine 298.

Figure 12:
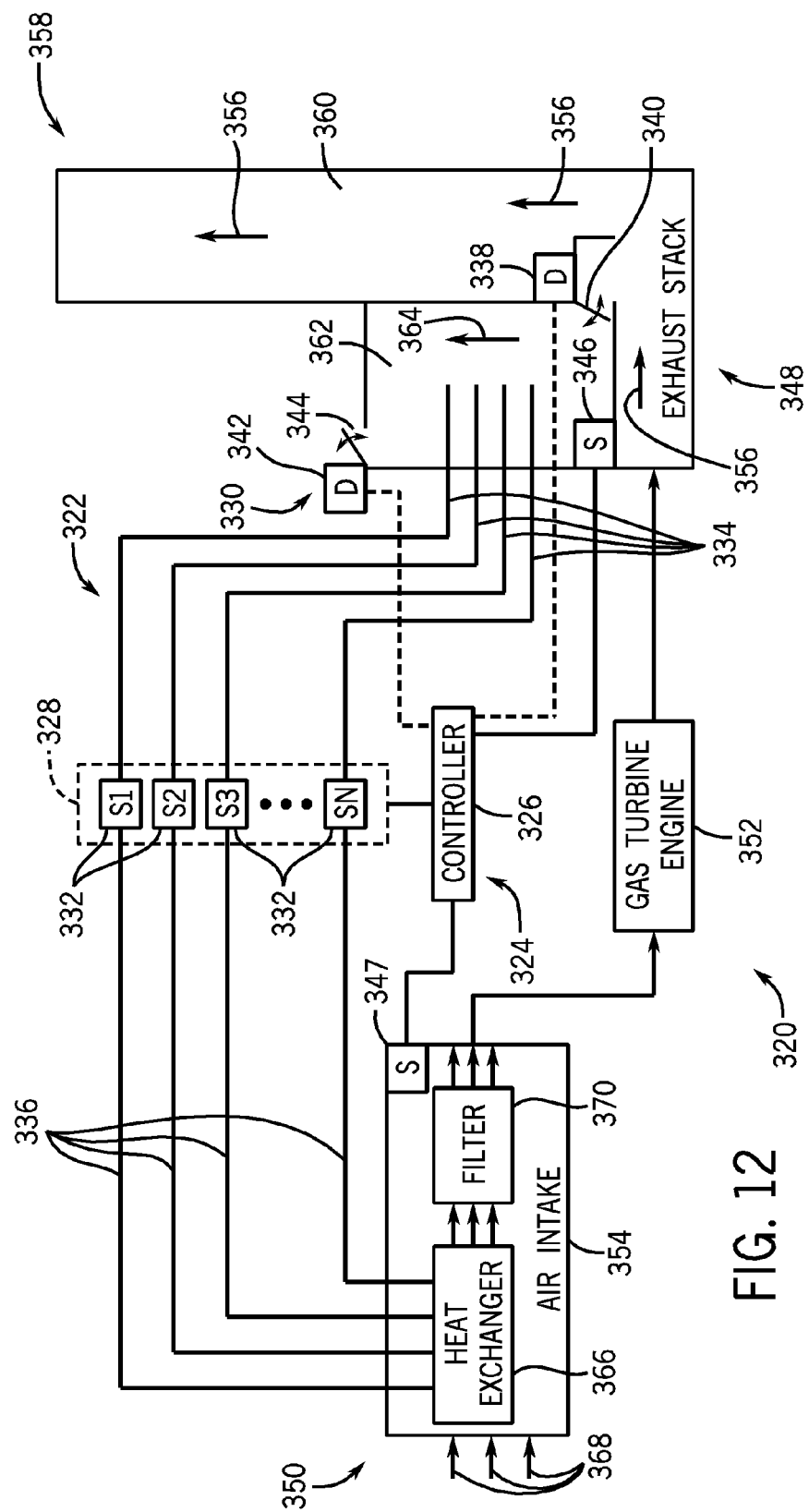
FIG. 12 is a schematic view of an embodiment of an anti-icing system for a gas turbine using superconductive heat transfer pipes to transfer energy from the gas turbine exhaust to the gas turbine air intake.

FIG. 12 is a schematic view of an embodiment of an anti-icing system 320 having a superconductive heat transfer system 322 with a control system 324 configured to enable and disable superconductive heat transfer for purposes of reducing or inhibiting ice formation. In the illustrated embodiment, the control system 324 includes a controller 326 coupled to a switch system 328 and a door system 330. The switch system 328 includes a set of conductive contact switches 332 disposed between first and second sets of superconductive heat transfer pipes 334 and 336, wherein each switch 332 selectively opens and closes a gap between a pair of adjacent pipes 334 and 336. Each switch 332 may have one or more features as illustrated in FIGS. 1-9. The door system 330 includes a drive 338 coupled to a door 340, a drive 342 coupled to a door 344, and at least one sensor 346.

The anti-icing system 320 uses the switch system 328 and/or the door system 330 to selectively transfer heat from a heat source 348 to a cold region 350 to reduce or inhibit ice formation. For example, if the controller 326 identifies a need for reducing or inhibiting ice formation, then the controller 326 may command one or more contact switches 332 to bridge a gap between the respective pipes 334 and 336 to enable superconductive heat transfer from the heat source 348 to the cold region 350. Each switch 332 bridging the gap between pipes 334 and 336 provides an incremental increase in the heat transfer capability of the system 322. Otherwise, the controller 326 may command one or more contact switches 332 to open the gap between pipes 334 and 336 to incrementally decrease the heat transfer capability of the system 322. By further example, if the controller 326 identifies a need for reducing or inhibiting ice formation, then the controller 326 may command the drives 338 and 342 to open the doors 340 and 344 to enable hot fluid flow across the pipes 334 (e.g., end portions of the pipes) to enable superconductive heat transfer from the heat source 348 to the cold region 350. Otherwise, the controller 326 may command the drives 338 and 342 to close the doors 340 and 244 to block the hot fluid flow across the pipes 334. Together, the controller 326 uses the door system 330 to substantially block or connect the heat source 348 (e.g., hot fluid flow) with the pipes 334, while the controller 326 uses the switch system 328 to incrementally change the amount of superconductive heat transfer between the first and second sets of pipes 334 and 336. The controller 326 may automatically control the switch system 328 and the door system 330 in response to feedback from sensors 346 in the heat source 348, sensors 347 in the cold region 350, or sensors elsewhere in the system 320.

In the illustrated embodiment, the anti-icing system 320 is coupled to a gas turbine engine 352. However, the system 320 may be used for anti-icing of any suitable application, such as machinery, engines, compressors, vehicles, or plant equipment. The gas turbine engine 352 includes one or more compression stages, one or more combustors, and one or more turbine stages. The gas turbine engine 352 operates to receive air through an air intake 354, compress the air via compressor blades in the compression stages, combust a mixture of the air and fuel in the combustors, drive turbine blades in the turbine stages with the hot combustion gases, and output an exhaust flow 356. In the illustrated embodiment, the exhaust flow 356 is used as the heat source 348, while the air intake 354 is used as the cold region 350. The exhaust flow 356 is selectively accessible by the door system 330 as it flows through a stack system 358. As illustrated, the stack system 358 includes a primary exhaust duct or stack 360 and a secondary exhaust duct or bypass stack 362. The door 340 defines an inlet or bypass from the stack 360 to the stack 362, while the door 344 defines an outlet from the stack 362. The anti-icing system 320 uses the door system 330 to selectively open and close the doors 340 and 344 to enable and disable a bypass exhaust flow 364 through the door 340, across the pipes 334 inside the stack 362, and out through the door 344. While the doors 340 and 344 are open, the exhaust flow 364 transfers heat to the pipes 334 and subsequently to the air intake 354 depending on the position of the switches 332. While the doors 340 and 344 are closed, the exhaust flow 364 is unable to transfer heat to the pipes 334.

In the air intake 354, the anti-icing system 320 includes a heat exchanger 366 configured to transfer heat from the pipes 336 to an incoming air flow 368, and a filter 370 to remove particulate matter and/or moisture from the incoming air flow 368. In certain embodiments, the heat exchanger 366 may include a plurality of fins coupled to or integral with the pipes 336. For example, the pipes 336 may terminate with fins protruding into the air flow 368 upstream of the filter 370. However, the heat exchanger 366 also may include a direct connection with the filter 370, a filter housing, or other structure in the air flow path into the gas turbine engine 352. In certain embodiments, the anti-icing system 320 also may couple the superconductive heat transfer system 322 to other components susceptible to ice formation or reduced performance at low temperatures, e.g., a water injection system and/or a fuel injection system for the gas turbine engine 352.

Technical effects of the invention include a superconductive heat transfer system, which includes a control system to selectively enable and disable superconductive heat transfer from a heat source to a cold region. The control system may include a plurality of superconductive heat transfer pipes (or other structures) and a contact switch that selectively connects and disconnects a superconductive heat transfer path from one pipe to another. The control system also may include a door system to selectively open and close a hot fluid flow (e.g., exhaust flow) across the pipes. In certain embodiments, an anti-icing system may incorporate the superconductive heat transfer system for use in various applications, such as anti-icing of an air intake for a gas turbine engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
 a turbine engine, comprising:
  a superconductive heat transfer assembly coupled to the turbine engine, comprising:
   a first superconductive heat transfer pipe;
   a second superconductive heat transfer pipe; and
   a first superconductive heat transfer contact switch, wherein the first superconductive heat transfer contact switch comprises a switch element configured to move axially across a first gap between the first superconductive heat transfer pipe and the second superconductive heat transfer pipe to enable energy transfer between the first superconductive heat transfer pipe and the second superconductive heat transfer pipe.

2. The system of claim 1, wherein the first superconductive heat transfer pipe is coupled to an exhaust conduit.

3. The system of claim 1, wherein the first superconductive heat transfer pipe is coupled to an intercooler between different stages of a compressor.

4. The system of claim 1, wherein the second superconductive heat transfer pipe is coupled to an air intake section.

5. The system of claim 1, wherein the first superconductive heat transfer pipe is coupled to an exhaust conduit of the turbine engine, and the second superconductive heat transfer pipe is coupled to an air intake section of the turbine engine.

6. The system of claim 1, wherein the first superconductive contact switch comprises a controller coupled to a drive, wherein the drive is configured to move the first superconductive heat transfer pipe relative to the second superconductive heat transfer pipe.

7. The system of claim 1, wherein the first superconductive contact switch comprises a controller coupled to a drive, wherein the drive is configured to move the first superconductive contact switch across the gap between the first superconductive heat transfer pipe and the second superconductive heat transfer pipe.

8. The system of claim 1, wherein the first superconductive heat transfer pipe comprises a male contact surface and the second superconductive heat transfer pipe comprises a female contact surface, and a controller is configured to open and close the first gap between the male and female contact surfaces.

9. The system of claim 8, wherein the male and female contact surfaces comprise curved surfaces or conical surfaces.

10. The system of claim 1, wherein the first superconductive heat transfer pipe comprises a first flat contact surface and the second superconductive heat transfer pipe comprises a second flat contact surface, and the controller is configured to open and close the gap between the first and second flat contact surfaces.

11. The system of claim 1, comprising a flow controller configured to control a flow of a first fluid across a first end portion of the first superconductive heat transfer pipe to transfer heat between the first fluid and the first superconductive heat transfer pipe.

12. The system of claim 1, wherein the superconductive heat transfer assembly comprises a plurality of superconductive heat transfer contact switches, wherein the plurality of superconductive heat transfer contact switches comprises:
    a second superconductive heat transfer contact switch having opposing tapered surfaces that engage and disengage one another across a second gap;
    a third superconductive heat transfer contact switch having opposing curved surfaces that engage and disengage one another across a third gap;
    a fourth superconductive heat transfer contact switch having opposing flat surfaces that engage and disengage one another across a fourth gap; or
    a fifth superconductive heat transfer contact switch having a conductive contact structure that engages and disengages surfaces on opposite sides of a fifth gap or a combination thereof.

13. The system of claim 1, comprising, a second superconductive heat transfer contact switch having opposing pipe end portions that engage and disengage one another across a second gap, wherein a drive is coupled to a controller to selectively move at least one of the opposing pipe end portions.

14. The system of claim 1, wherein the at least one of the first or second superconductive heat transfer pipes has an enlarged end portion configured to increase heat transfer between the first superconductive heat transfer contact switch and the first and second superconductive heat transfer pipes.

15. The system of claim 1, wherein the switch element is a superconductive heat transfer sleeve.

16. A system, comprising:
    a turbine engine;
    a superconductive heat transfer assembly, comprising:
        a superconductive heat transfer pipe having first and second end portions;
        a superconductive heat transfer contact sleeve configured to close a gap by coupling to the first and second end portions in a closed position to enable heat transfer through the superconductive heat transfer pipe and to open the gap between the first and second end portions to disable heat transfer through the superconductive heat transfer pipe in an open position; and
    a flow controller configured to control a flow of a first fluid from the gas turbine engine across the first end portion to transfer heat between the first fluid and a second fluid flowing past the second end portion of the superconductive heat transfer pipe.

17. The system of claim 16, wherein the first fluid comprises an exhaust gas flow, and the flow controller is configured to adjust the exhaust gas flow across the first end portion to adjust the superconductive heat transfer between the exhaust gas flow and the superconductive heat transfer pipe.

18. The system of claim 16, wherein the first fluid comprises an airflow, and the flow controller is configured to adjust the airflow across the first end portion to adjust the superconductive heat transfer between the air flow and the superconductive heat transfer pipe.

19. The system of claim 16, wherein the first fluid comprises a lubricant flow, and the flow controller is configured to adjust the lubricant flow across the first end portion to adjust the superconductive heat transfer between the lubricant flow and the superconductive heat transfer pipe.

20. The system of claim 16, wherein the superconductive heat transfer pipe is configured to transfer heat between the first and second end portions, and the second end portion is configured to transfer heat between the superconductive heat transfer pipe and an air intake section of an engine.

21. The system of claim 16, comprising a protective sleeve, wherein the protective sleeve surrounds the gap in the superconductive heat transfer pipe.

22. A system, comprising:
    a superconductive heat transfer assembly, comprising:
        a first superconductive heat transfer pipe comprising a first pipe section and a second pipe section;
        a first conductive contact switch configured to open and close a first gap between the first and second pipe sections;
        a second superconductive heat transfer pipe comprising a third pipe section and a fourth pipe section;
        a second conductive contact switch configured to engage and disengage surfaces of the third and fourth pipe sections on opposite sides of a second gap;
        a first controller coupled to a first drive, of the first conductive contact switch, wherein the first controller is configured to control the first conductive contact switch to enable the first drive to move at least the first pipe section or the second pipe section across the first gap; and
        a second controller coupled to a second drive of the second conductive contact switch, wherein the second controller is configured to control the second conductive contact switch to enable the second drive to move the second conductive contact switch across the second gap.

23. The system of claim 22, wherein the first and third pipe sections are coupled to an exhaust conduit, and the second and fourth pipe sections are coupled to an air intake section.

* * * * *